June 11, 1957     A. HONKANEN     2,795,263
APPARATUS FOR APPLYING TAPE TO CONTAINERS
Filed May 4, 1956     3 Sheets-Sheet 1

INVENTOR.
ARVID HONKANEN
BY Charles H. Erne
Leland R. McCann
George W. Reiber
ATTORNEYS

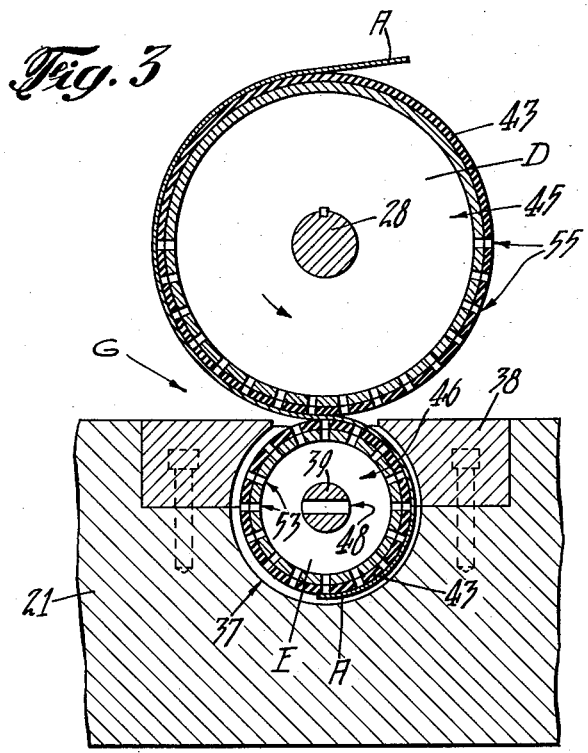
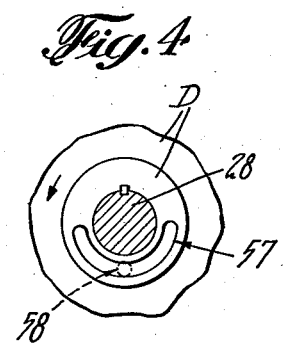
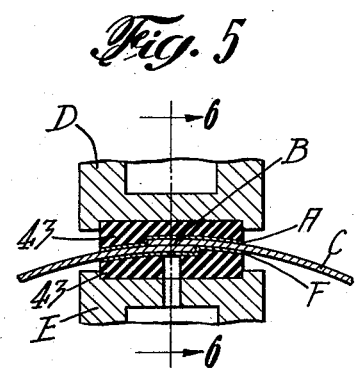
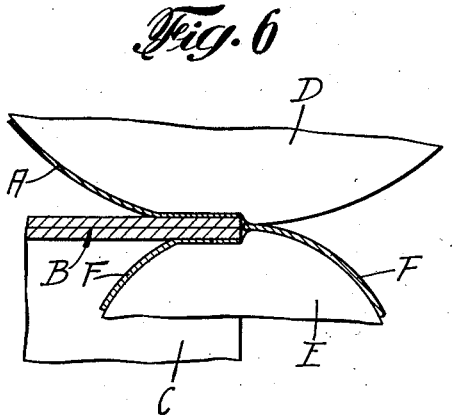
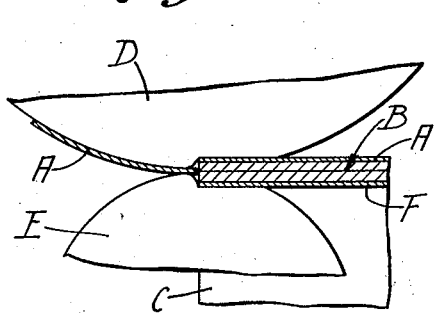

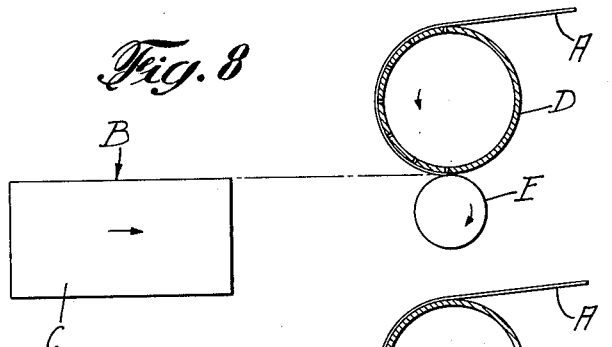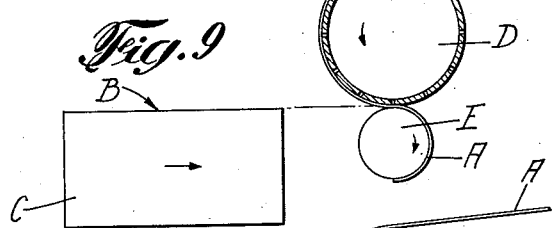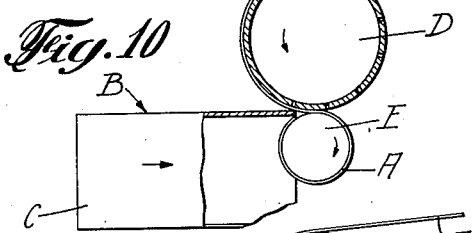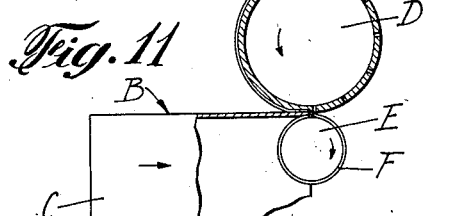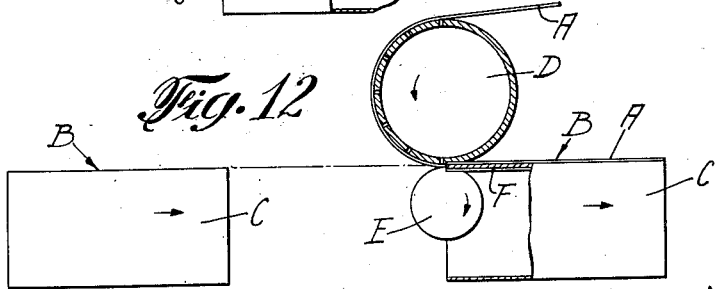

United States Patent Office 2,795,263
Patented June 11, 1957

2,795,263

APPARATUS FOR APPLYING TAPE TO CONTAINERS

Arvid Honkanen, Barrington, Ill., assignor to American Can Company, New York, N. Y., a corporation of New Jersey Application May 4, 1956, Serial No. 582,783

13 Claims. (Cl. 154—42.3)

The present invention relates to apparatus for applying tape to the side seam of a can body and has particular reference to devices for applying the tape to opposed faces of the seam from a single source of the tape.

An object of the invention is the provision of an apparatus for applying tape to the outer and inner faces of the side seam of a can body.

Another object is to effect such an application of tape to the side seam of a can body in such a manner that the body may be advanced along a continuous path of travel in a single direction so that the bodies may be fed in processional order from one machine to another during their manufacture.

Another object is to effect such an application of tape from a single source or continuous length of such tape so as to overcome interference from within the can body.

Numerous other objects and advantages of the invention will be apparent as it is better understood from the following description, which, taken in connection with the accompanying drawings, discloses a preferred embodiment thereof.

Referring to the drawings:

Fig. 3 is a sectional view taken substantially along the line 3—3 in Fig. 2, with parts broken away;

Fig. 4 is a fragmentary elevation illustrating a valve detail, the view being taken substantially along a plane indicated by the line 4—4 in Fig. 2;

Fig. 5 is an enlarged fragmentary sectional view taken substantially along the line 5—5 in Fig. 2 with a can body side seam in position for taping;

Fig. 6 is an enlarged fragmentary sectional view taken substantially along the line 6—6 in Fig. 5 and showing the leading edge of the side seam of a can body in place;

Fig. 7 is a view similar to Fig. 6 showing the trailing edge of the side seam in place; and Figs. 8 to 12 inclusive are schematic sectional views showing the relation of the tape and a can body in various stages during the application of the tape to the body.

Figure 1:
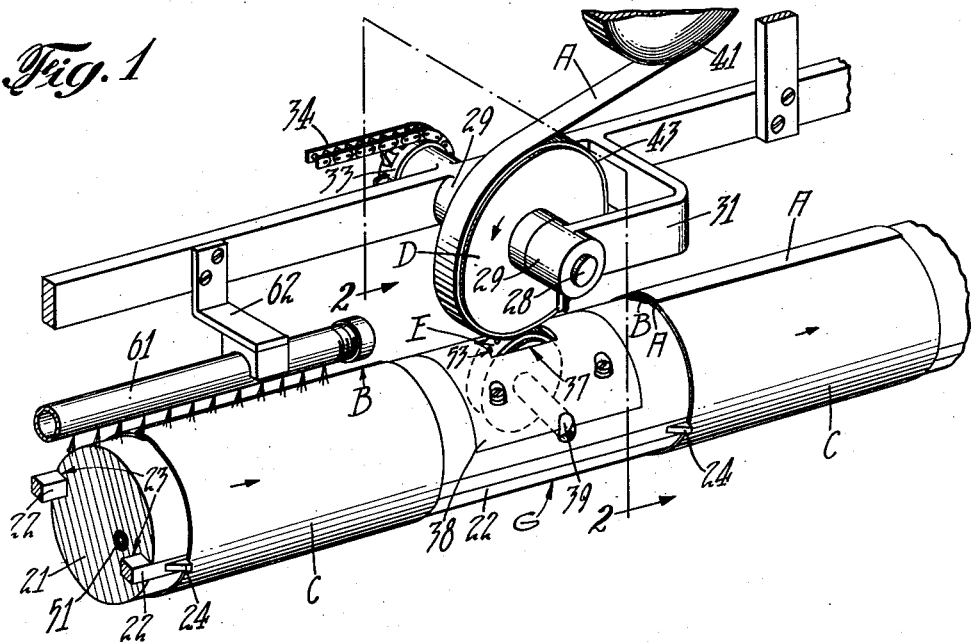
Figure 1 is a perspective view of a tape applying apparatus embodying the instant invention, with parts broken away and with can bodies in position in the apparatus.

As a preferred or exemplary embodiment of the instant invention the drawings illustrate an apparatus for applying a substantially continuous tape A (Fig. 1), preferably of substantially solid, preformed, natural or synthetic thermoplastic material, to the outer and inner opposed faces of a lapped side seam B (Fig. 5) of a sheet metal tubular can body C preferably made of tin plate, black iron or other suitable can or container body material.

To effect application of the tape A to both the outer and inner faces of the side seam B of a tubular can body, the apparatus is provided with outer and inner applicator elements, preferably rollers D, E respectively (Figs. 3 and 8) disposed in substantially tangential relation and in which the outer applicator element D receives and advances the continuous web of tape A as shown in Fig. 8 and transfers to the inner applicator element E as shown in Fig. 9 an integral length sufficient to apply to the inner face of the seam, the tape A crossing over from roller D to roller E at their point of tangency. The side seam B of the can body is then passed between the rollers D, E to receive the tape.

As the seam B enters between the applying rollers D, E as shown in Figs. 10 and 11, the roller D pinches or squeezes the tape against the leading edge of the seam with a force or pressure sufficient to cause the edge of the seam to cut through the tape and thereby sever the continuous web thereby leaving a separated portion F of the tape on the inner roller E and the tape on the outer roller D still connected to the supply reel (see also Fig. 6). With continued advancement of the can body, the inner roller E presses its portion F of the tape A against the inner face of the side seam B and the outer roller D presses the tape A carried thereon against the outer face of the side seam, thereby effecting the application of the tape to both opposed faces of the seam simultaneously as the seam passes between the rollers. A pressure sensitive coating on the tape A causes it to cling to the seam, or the container body C or the rollers D—E may be heated to cause certain hot sensitive tape material to cling to the seam.

As the can body is about to leave the bite of the rollers D, E, the trailing edge of the side seam reaches the point of tangency of the rollers and the outer roller D pinches or squeezes the tape on the outer roller against the trailing edge of the seam with a force or pressure sufficient to cause the edge to cut through the tape in a manner similar to that effected at the leading edge, with the result that the tape on the outer face of the seam is cut free from the continuous web on the outer roller D (see also Fig. 7). The can body with the tape thus applied to both faces of the side seam continues on in the same direction for any subsequent operation and the outer roller D immediately starts transfer of the tape to the inner roller E for a repeat operation on another can body seam. This completes the cycle of operation of the apparatus.

In the apparatus, the tape A is applied to the can bodies C preferably as they are advanced in spaced and timed, processional order, along a straight line path of travel in one direction extending between machines or stations in a single machine which performs other operations on the bodies as an incident to their manufacture. For this purpose the can bodies C preferably are supported on a horn or mandrel 21 (Fig. 1) with their side seams B arranged in endwise aligned relation along the top of the horn.

Figure 2:
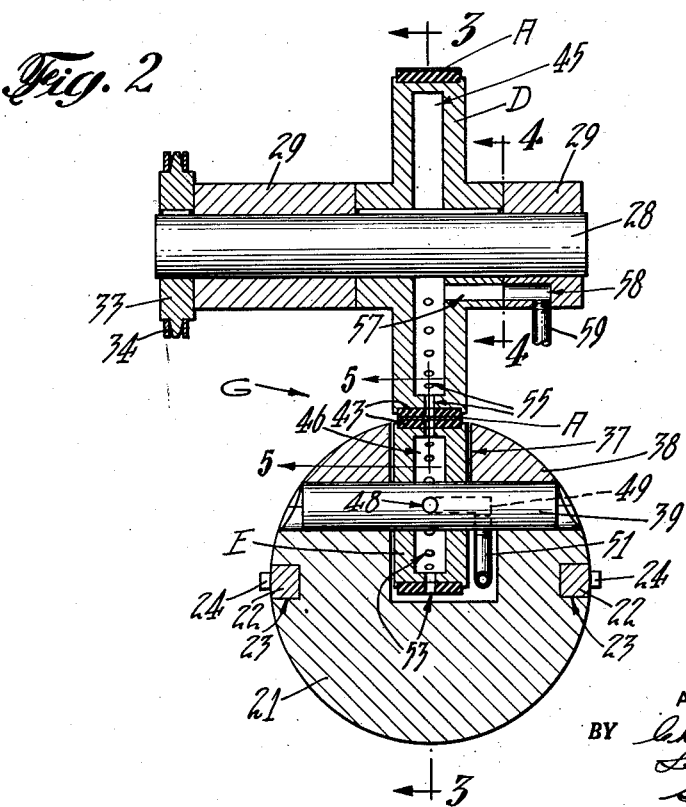
Fig. 2 is an enlarged sectional view taken substantially along a plane indicated by the lines 2—2 in Fig. 1.

The bodies C preferably are advanced along the horn 21 in a step-by-step fashion, by a pair of stroke bars 22 slidably disposed in longitudinal grooves 23 formed in the horn (see also Fig. 2). The stroke bars 22 are reciprocated in any suitable manner through a forward or advancing stroke (toward the right as viewed in Fig. 1) and thence through a return stroke. Spring pressed feed dogs 24 are provided in the stroke bars 22 at spaced intervals along their lengths for propelling engagement against the trailing edges of the bodies to effect advancement of the bodies along the horn and into the bite of the applicator rollers D, E, and to continue the advancement of the bodies beyond the rollers.

The applicator elements or rollers D, E are disposed at a tape applying station G. The outer applicator element or roller D is disposed in a vertical position, outside of the horn 21, with its outer periphery substantially tangent to the top of the horn. The roller D is mounted for rotation on a cross-shaft 28 which preferably is disposed at right angles to the horn 21 and is journaled in a pair of spaced bearings 29 formed in a subframe 31 which may be a part of or supported on the main frame of the machine which supports the horn. The shaft 28 preferably is rotated continuously by a sprocket 33 which is rotated by an endless chain 34 driven in any suitable manner in time with the advancement of the can bodies along the horn 21.

The inner applicator element or roller E is disposed directly under the outer applicator element or roller D, in a recess 37 formed in the horn 21 and in a half bearing cap 38 inserted in the horn. The roller E is rotatable on a stationary short shaft 39 carried in the horn and the cap and is rotated through frictional peripheral engagement with the outer applicator roller D.

The tape A to be applied to the can body side seam B is carried on the outer periphery of the outer applicator roller D and is received in a substantially continuous length from a supply reel 41 (Fig. 1) supported in any suitable manner in the subframe 31. The tape carried on the outer roller D preferably extends halfway around the periphery of the roller to effect proper gripping of the tape. In proportion, the outer roller D preferably is twice the diameter of the inner roller E. The inner roller E is proportioned with a circumference substantially equal to the length of the can body side seam B so that a length of tape wrapped around the inner roller E is of a length equal to the length of the side seam. The outer peripheries of the roller D, E preferably are fitted with resilient flat rings or tires 43, made of rubber or other suitable material, to facilitate pinching the tape against the leading and trailing edges of the side seam to cut off the tape as hereinbefore mentioned.

In order to provide for proper feeding of the tape A from the outer roller D to the inner roller E, the tape is attracted to the outer faces of the rollers by vacuum. For this purpose the rollers D, E are formed with hollow interior vacuum chambers 45, 46 respectively (see Figs. 2 and 3). A vacuum is drawn continuously on the chamber 46 of the inner roller E through an aperture 48 disposed diametrically in the stationary shaft 39 on which the roller rotates.

The aperture 48 in the shaft 39 communicates with an axially disposed channel 49 which is formed in the shaft and which communicates with a vacuum pipe 51. The vacuum pipe 51 projects into the roller recess 37 in the horn 21 and extends back along the horn through a suitable connecting conduit which leads to the feed-in end of the machine where it is free from interference with the incoming can bodies C. The vacuum pipe 51 leads back to any suitable source of vacuum such as a vacuum pump or other device.

The vacuum drawn on the chamber 46 is communicated to the outer face of the inner roller E by way of small holes or apertures 53 formed in the tire 43 and the adjacent peripheral wall of the roller. This vacuum is drawn continuously to attract the tape A to effect the transfer of the tape from the outer roller D to the inner roller E as the roller D feeds the tape into place at the point of tangency of the rollers.

In a similar manner, vacuum is utilized to attract the tape A to the outer periphery of the outer roller D to effect feeding of the tape from the supply reel 41 to the inner roller E and to hold the tape on the roller when it is cut off at the trailing edge of the can body, from the portion applied to the seam. For this purpose small holes or apertures 55 (Figs. 2 and 3) are formed in the tire 43 and the adjacent peripheral wall of the outer roller D for communication with the vacuum chamber 45 in the roller. However, these apertures 55 are provided in only one half of the circumference of the outer roller D, i. e. that half which extends back from the point of cut off at the trailing edge of a body to the upper portion of the roller where it receives the tape from the supply reel 41, as best shown in Figs. 12 and 8. The apertures 55 are arranged in this manner and vacuum is drawn on them at this time in their cycle of rotation so as to insure secure holding of the cut off end of the tape in place against the roller D until the end of the tape is advanced into clamped position between the rollers to effect the transfer to the inner roller E. Thereafter the vacuum on the outer roller D is not required.

This timed vacuumization of the chamber 45 of the outer roller D is effected through an arcuate valve slot 57 (Figs. 2 and 4) formed in the hub of the outer roller D and extending through a properly located arc of substantially 180 degrees. During rotation of the outer roller D this valve slot 57 rotates into and out of register with a stationary port 58 in the adjacent roller shaft bearing 29. The port 58 communicates with a vacuum pipe 59 which leads to any suitable source of vacuum, such as a vacuum pump or other device.

In cutting off the tape A against the leading and trailing edges of the can body, it has been found that the cutting operation is facilitated when the edges are heated. The temperature required depends upon the character of the tape. For a thermoplastic tape it has been found that a temperature of 450° F. to 500° F. is sufficient to give satisfactory results. For this purpose the can body side seam B preferably is subjected to a preheating treatment just prior to its passage between the applicator rolls D, E. This is effected by passing the side seam B under a heating element such as an electric or gas burner 61 (Fig. 1) which is disposed immediately above the path of travel of the can bodies along the horn 21. The heating element 61 is supported on a bracket 62 attached to the subframe 31.

In such an apparatus the can body C is advanced in spaced processional order along a continuous path of travel in one direction only and during the time and space interval of one can body C leaving the tape applying station G and another can body C arriving at station G, the outer applicator roller D feeds a predetermined length of tape to the inner applicator roller E, so that as the body advances between the rollers, the tape on both rollers is ready to be applied to both opposed faces of the side seam B and is cut off at the ends of the seam to produce an efficiently and rapidly taped can body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for applying tape to inner and outer faces of side seams of tubular can bodies, comprising in combination outer applicator means for receiving and advancing a substantially continuous tape, inner applicator means disposed adjacent said outer applicator means for receiving from said outer applicator means a length of said tape, and means for advancing the side seam of a said can body between said outer and inner applicator means to effect application of the tape on said inner applicator means to the inner face of said side seam and to effect application of the tape on said outer applicator means to the outer face of said side seam.

2. Apparatus of the character defined in claim 1 wherein said outer applicator means is a roller and wherein said inner applicator means is a roller disposed peripherially adjacent said outer applicator roller.

3. Apparatus of the character defined in claim 2 wherein said inner applicator roller is of a diameter less than the inside diameter of said can body and of a circumference sufficient to carry a length of tape equivalent to the length of said side seam.

4. Apparatus of the character defined in claim 2 in which there is provided means for rotating said outer applicator roller and wherein said inner applicator roller is driven through frictional peripheral engagement with said outer applicator roller.

5. Apparatus of the character defined in claim 2 wherein the tape on said inner applicator roller initially is an integral continuation of the tape on said outer applicator roller and wherein the peripheries of said rollers are relatively disposed with the tape between them to force said tape against the leading edge of the side seam advanced between said rollers to sever the tape on said inner roller from the tape on said outer roller for application of the tape on both rollers to said side seam and to force said tape on the outer roller against the trailing edge of said seam to cut off the outer applied tape from the remaining tape on said outer roller.

6. Apparatus of the character defined in claim 5 in which at least one of said rollers is provided with a resilient peripheral face to facilitate severing of said tape against the leading and trailing edges of said side seam.

7. Apparatus of the character defined in claim 5 in which means are provided to heat the leading and trailing edges of said side seam to facilitate severance of said tape against said edges.

8. Apparatus of the character defined in claim 2 in which there is provided means for retaining said tape in position on the outer peripheries of said rollers.

9. Apparatus of the character defined in claim 2 in which the outer peripheries of said rollers are provided with spaced apertures and in which there is provided means for drawing a vacuum on said apertures to retain said tape in position on said rollers.

10. Apparatus of the character defined in claim 1 in which said can body is supported on a longitudinal horn and in which means are provided for advancing said can body along said horn for the application of said tape to said side seam.

11. Apparatus of the character defined in claim 10 wherein said inner applicator means is a roller freely mounted in said horn with its outer periphery substantially flush with the outer face of said horn and wherein said outer applicator means is a roller rotatably mounted outside said horn and in peripheral engagement with said inner applicator roller.

12. Apparatus of the character defined in claim 11 in which said outer applicator roller rotates said inner applicator roller through frictional engagement therewith and in which there is provided means for rotating said outer applicator roller in synchronism with the advancement of said can body along said horn.

13. Apparatus of the character defined in claim 11 wherein the tape on said said inner roller is an integral continuation of the tape on said outer roller and wherein the peripheries of said rollers are relatively disposed with the tape between them to force said tape against the leading and trailing edges of the side seam advanced between said rollers to sever the tape prior to and after application to said side seam, and wherein there is provided heating means disposed adjacent said horn in the path of travel of said side seam in advance of said rollers for heating said leading and trailing edges to facilitate severance of said tape.

No references cited.